(12) United States Patent
Wang et al.

(10) Patent No.: US 8,438,184 B1
(45) Date of Patent: May 7, 2013

(54) UNIQUELY IDENTIFYING A NETWORK-CONNECTED ENTITY

(75) Inventors: Changfeng C. Wang, Lexington, MA (US); Hsu-Tang Pu, Carlisle, MA (US)

(73) Assignee: Adelphic, Inc., Lexington, MA (US)

( * ) Notice: Subject to any disclaimer, the term of this patent is extended or adjusted under 35 U.S.C. 154(b) by 0 days.

(21) Appl. No.: 13/562,065

(22) Filed: Jul. 30, 2012

(51) Int. Cl.
*G06F 7/00* (2006.01)
*G06F 17/00* (2006.01)

(52) U.S. Cl.
USPC .......................................................... 707/780

(58) Field of Classification Search .................... 707/780
See application file for complete search history.

(56) References Cited

U.S. PATENT DOCUMENTS

| | | | |
|---|---|---|---|
| 6,073,241 A | 6/2000 | Rosenberg et al. | |
| 6,480,844 B1 | 11/2002 | Cortes et al. | |
| 6,629,149 B1 | 9/2003 | Fraser et al. | |
| 7,428,587 B2 | 9/2008 | Rowland et al. | |
| 7,551,913 B1 | 6/2009 | Chien | |
| 7,657,254 B2 | 2/2010 | Jo | |
| 7,853,533 B2 | 12/2010 | Eisen | |
| 2002/0007317 A1 | 1/2002 | Callaghan et al. | |
| 2009/0128513 A1 | 5/2009 | Han et al. | |
| 2010/0185644 A1 | 7/2010 | Gutt et al. | |
| 2010/0228625 A1 | 9/2010 | Priyadarshan et al. | |
| 2010/0332331 A1 | 12/2010 | Etchegoyen | |
| 2011/0185051 A1 | 7/2011 | Reno | |

OTHER PUBLICATIONS

Edge et al, "A survey of signature based methods for financial fraud detection", ScienceDirect, Computers & Security 28, pp. 381-394 (2009).
Cortes et al, "Hancock: A Language for Extrating Signatures from Data Streams", ACM 2000.
Pang et al, "802.11 User Fingerprinting", ACM 2007.
Jackson et al, "Protecting Browser State from Web Privacy Attacks", ACM 2006.
Cohen et al, "A Comparison of String Metrics for Matching Names and Records", American Association for Artificial Intelligence, 2003.
Felligi, et al, "A Theory for Record Linkage", Journal of the American Statistical Association, Dec. 1969.
Odinmobile Open Device Identification No. http://code.google.com/p/odinmobile/wiki/ODINI retrieved from Internet Sep. 15, 2012.
"Chatter on the Wire: How excessive network traffic gives away too much!" retrieved from Internet Sep. 15, 2012.

*Primary Examiner* — Ann Chempakaseril
(74) *Attorney, Agent, or Firm* — David H. Judson (57) ABSTRACT

An entity (a device, a user of a device or set of devices, a user of one or more applications on a device, a group of users of the device or set of devices, or the like) is identified across multiple device, usage, and application domains. The entity is assigned a unique entity identity that is generated from a set of feature data that model the entity. The feature data typically includes deterministic data, device and system-specific feature data, and usage feature data. The identity is generated by applying to the feature data one or more rules that identify which of the feature data to use to generate the entity identity. The rules include at least one deterministic rule, and at least one probabilistic rule. Periodically, an identity is merged into one or more entity identities that are found, by applying a rule, to represent a same entity.

20 Claims, 2 Drawing Sheets

UNIQUELY IDENTIFYING A NETWORK-CONNECTED ENTITY

BACKGROUND

1. Technical Field

This disclosure relates generally to uniquely identifying an entity across multiple device, usage, and application domains.

2. Background of the Related Art

Communication networks are increasingly becoming the backbone connecting the social fabric in modern society. The types of network-connected devices that are widely used today vary from desktop personal computers, laptops, mobile phones, tablet devices, Internet-based TV, and the like, and many more Internet-connected devices are being introduced and/or planned. While these devices provide ready access to Internet-based content and applications, it is not always easy to determine an identity of a person or entity associated with the device making the access request. As is well-known, the ability to uniquely identify the device, the user, or the user group (e.g., household), typically is required in many applications, such as advertising and marketing, personalized content or service delivery, fraud detection, tracing Internet crimes, and integrated together user data from different communication channels. In advertising, for example, advertisers and marketers often wish to engage (e.g., target and/or re-target) the same user across different media content (e.g., Web sites, mobile applications, and the like), and to track user interaction and responses as well as campaign effectiveness across all these media channels.

For mobile applications, typically a device identifier, such as a UDID in iOS™ devices, and the Android_ID in Android™ OS devices, is used to identify a device. A major advantage of identifiers of this type is that they are unique to a device, and all the applications to which the device has access theoretically share the same identifier. This same advantage, however, creates privacy and security concerns, and these concerns have discouraged the use of such identifiers for identity purposes. Indeed, in some cases these device identifiers are being made inaccessible to developers. Other unique device identifiers, such as MAC address, IMEI, and ESN, are being proposed as substitutes. These alternatives, suffer from some of the same concerns as those that exist with the UDID, but they are also are difficult to use because there are no clearly-defined ways to access them. Another approach is to the problem uses application-generated identification. These approaches, which are available through initiatives such as openUDID, SecureUDID, and ODIN, overcome many of the deficiencies of the device-specific approach. Nevertheless, because these identifiers are assigned by applications, they are accessible only to the applications that have permission to access them.

Another common limitation of both the device-specific and application-generated approaches is from the perspective of usage monitoring in that they do not address or solve the problem of identification of an entity that uses different devices (such as a mobile phone and a tablet) to access the same content.

HTTP cookies have long been a de facto standard for identifying unique users on the Web. However, cookie-based techniques suffer from several problems in that they cannot be used easily in non-browser-based applications, which now account for the vast majority of mobile applications. Further, cookies are device and browser-specific; two browsers (or distinct browser instances) on the same device receive two different cookies from the same domain. Conversely, different users of the same device and browser receive the same cookie when they visit a particular domain. Further, cookie support in mobile device-based browsers is not stable and, in general, the approach does not work well with mobile applications. Even when cookie support works, different devices are identified by different cookies. Moreover, because cookies are stored on the client, they are subject to blockage and deletion. Further, because of privacy concerns, browsers often implement functions that it makes it increasingly easy to disable and delete them.

For the mobile web, many techniques besides cookies are being tried for device identification. These include, without limitation, packet sniffing, web beacons, HTTP header information, IP addresses, and the like. Those variables alone often are not enough to serve as persistent device identifiers. These approaches may be combined with fingerprint-based device identification methods for fixed network devices, although the results have variable reliability. Browser fingerprints, for example, which work well with the fixed Web, become unreliable when applied to a mobile Web browser because little user and device-level customization are available to serve as distinguishing features. In addition, such information pertains only to the device, as opposed to the user of the device.

These and other deficiencies of the prior art are addressed by this disclosure.

BRIEF SUMMARY

This disclosure describes a method, system and computer program for identifying an entity across multiple device, usage, and application domains. As used herein, an "entity" is one of: a device, a user of a device or set of devices, a user of one or more applications on a device, and a group of users (such as a household) of the device or set of devices.

In particular, an entity is identified across multiple device-, usage-, and application-domains by being assigned a unique entity identity that is generated from a set of feature data that model the entity. The feature data typically includes deterministic data, device and system-specific feature data, and usage feature data. The identity is generated by applying to the feature data one or more rules that identify which of the feature data to use to generate the entity identity. The rules include at least one deterministic rule, and at least one probabilistic rule. Periodically, an identity is merged into one or more entity identities that are found, by applying a rule, to represent a same entity.

According to one embodiment, a method for identifying an entity begins by generating a unique entity identity for the entity. The entity identity is generated from a set of feature data that model the entity. The feature data typically includes data associated with a feature data "type" selected from a set of feature data types, the set of feature data types being one or more of: deterministic data, device and system-specific feature data, and usage feature data. The deterministic data is data (e.g., a cookie, a device identifier, an MSISDN, a phone number, an email address, a user identifier such as an OpenId, or the like) assigned to a user by a provider. The device and system-specific feature data may be quite varied and typically is one of: operating system (OS) type, OS version, system clock value, execution speed, time of last installation, time of last boot, system default language, system local time, time zone offset, orientation, a display metric, a globally unique identifier (GUID), a model, a brand name, and a build version. The usage feature data also may be quite varied and typically is one of: HTTP headers, usage agent information, user query data, application launch time, application exit time, network type, page load time, page unload time, day and time of access, day of week, time of day, page referrer, plug-in data, geo-data, location data, URL view data, typing frequency data, and gesture data. In this approach, the entity identity is generated by applying to the feature data one or more rules selected from a set of rules, the one or more rules identifying which of the feature data to use to generate the entity identity, wherein the one or more rules include at least one deterministic rule, and at least one probabilistic rule. Periodically, a unique entity identity is merged into one or more entity identities that are found, by applying a rule, to represent a same entity.

In a preferred embodiment, the entity identity is generated by applying at least one probabilistic matching rule on usage feature data. In a particular embodiment, a probabilistic matching function is applied to a measure of closeness (e.g., as derived from a distance metric) between the usage feature data and a set of encoded feature attributes. The unique entity identity generated in this manner is maintained in a database (of other such unique entity identities) that is accessible by one or more applications, such as an advertising (ad) engine, a product recommendation engine, a fraud detection engine, a conversion tracking engine, a database program, and the like. Thus, in one use-case, the application is an ad engine that provides a signature. A determination is then made whether the signature corresponds to an entity represented by a unique entity identity in the database. The determining step may encode the signature to generate an encoded signature, and then one or more rules are applied to the encoded signature to determine whether a result corresponds to a unique entity identity in the database. If so, the unique entity identity is returned, which identity is then available for use by the application to generate custom content (or other content specific to the unique entity identity). If, however, the signature does not correspond to an entity represented by a unique entity identity in the database, the result (which represents a new unique entity identity) is then added to the database. In a practical implementation, the actual addition of a new entity identity to the database may be done in real-time, or it may be added in a batch processing mode, depending on the real-time rule processing results.

The approach and identification mechanism described herein are useful for identifying entities that are connected to a communication network through one or more devices and, in response, delivering to the entity customized content, tracking user interactions and responses to advertising, even where no predefined identifiers exist (e.g., in mobile advertising exchanges), targeting and re-targeting users in one media context (e.g., mobile) based on interactions in another context (e.g., online), and integration of user data from disjoint communication networks (such as online and mobile networks). As noted above, the entity may be a user, and subgroups of users, such as the individuals within a household. In a simple embodiment, the entity is merely the physical device itself. In a typical setup, and when the entity is a user or a user group, the entity accesses the network through multiple devices, such as mobile phones, tablets, desktop or laptop computers, and other connected devices. The identification mechanism also enables identification of the entity that uses the one or more devices to access the same content. It can also be used to identify different entities that use the same device to access the content, such as when members of a household access the same content through a shared computer. Of course, these use cases are merely exemplary.

The foregoing has outlined some of the more pertinent features of the disclosed subject matter. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN
ILLUSTRATIVE EMBODIMENT

According to this disclosure, preferably users and their devices are identified through a set of one or more features, although not all of these features need to be present at the same time. Depending on the nature of the feature, a single feature may be sufficient to uniquely identify the entity. Thus, e.g., when the entity is a single user using a single device, and where the feature is a device ID, that ID itself is enough of an identifier. On the other hand, when the device ID is not available, or when the same user uses multiple devices to access the content, a single identifier of this type typically is not available to identify the user. Indeed, and as will be seen below, when many of these features are combined (or aggregated), they can be used to link to the same entity.

Thus, according to one aspect of this disclosure, a set of features (or a subset thereof) are associated together to identify the entity. Preferably, a set of rules are used to select the feature set (or the subset of features) to use in identifying the entity. In a preferred embodiment, the rules comprise a set of one or more expert rules, as well as a set of one or more probabilistic (induction-based) rules, which rules are applied to the feature set to identify the entity uniquely (from an existing database of such entity identifiers) or to generate a new such identity. In a preferred (but non-limiting) embodiment, the combination of expert and induction rules provides significant advantages for entity identification in communication networks. As will be seen, this allows leveraging the signature information for cross-device entity identification. Moreover, the approach provides significant advantages in use cases where it is desired to use online data sources for targeting mobile users but where there is no known data attribute (such as phone number, email address, or the like) to link mobile and online identifiers.

Preferably, the system takes in as input a specific subset of features signatures and examines set of ranked rules to find unique identifiers, preferably in real-time. As will also be seen, typically not all features can be linked easily to the same identifier in real-time because the feature set may change, because entity may start to use a new device whose feature set and usage pattern are not yet recognized, or other reasons. To this end, and according to another aspect of this disclosure, the system preferably has an off-line process that routinely merges identifiers that refer to the same identity, and updates the database accordingly.

Without meant to be limiting, preferably the identification system and functionality resides on or in conjunction with server-side architectures including, for example, simple n-tier architectures, web portals, federated systems, application servers, cloud-based architectures, and the like. This is in contrast to implementing the functionality within the client devices that connect to the network. Thus, when the entity accesses a server through a heterogeneous communication network with multiple devices, such as a mobile phone, a tablet, a laptop, or the like, the same identifier can be linked to the entity, preferably with an associated confidence level. As will be described, for mobile devices, a unique identifier is used for Web browsers as well as different applications.

In one (non-limiting) use case, the identification system comprises a component of a mobile ad platform. A platform of this type includes computing resources (systems, subsystems, machines, programs, processes, databases, interfaces, APIs, and the like) to connect marketers/advertisers with publishers/application developers. The platform may be used to create a mobile ad exchange that allows advertisers and publishers to buy and sell mobile ad impressions with more intelligence behind each impression. When an advertiser is bidding on an impression, the platform enables the advertiser to be provided with information (and, in particular, the entity identity) regarding the user, device, context and location, so that the advertiser can make a better buying decision. The mobile ad platform creates a more efficient market for buying and selling mobile inventory while increasing return on investments for advertisers (by helping them buy only performing inventory), as well as increasing eCPMs for publishers (by helping them sell their inventory with the related audience information included). Publishers provide the ad platform with access to their inventory (to enable the platform to sell it), and the platform may share resulting revenues with the publishers. The ad platform also gains access to third party exchange inventory by buying impressions, e.g., through their auction process, and the platform obtains ad revenue by selling this inventory to advertisers and agencies in a targeted manner using a real-time bidding auction. The mobile ad platform also may integrate with third party platforms and services including, without limitation, a Demand-side Platform (DSP), which works for advertisers to place their ads in a targeted manner, Data Management Platform (DMP), which aggregates audience data to be used for targeting and sale to DSPs, and a Supply-side Platform (SSP), which works with publishers to aggregate inventory and to sell it through exchanges trying to get the best price for each impression.

With respect to the entity identification function of this disclosure, the mobile ad platform uses the identification mechanism to receive (from a calling application) a request, typically via HTTP (or a SOAP or RESTful call) and, in response, to returns an entity identity. Preferably, the entity identity is then used to retrieve corresponding data attributes, such as demographics, psychographics, behavior data, and intention data.

Figure 1:
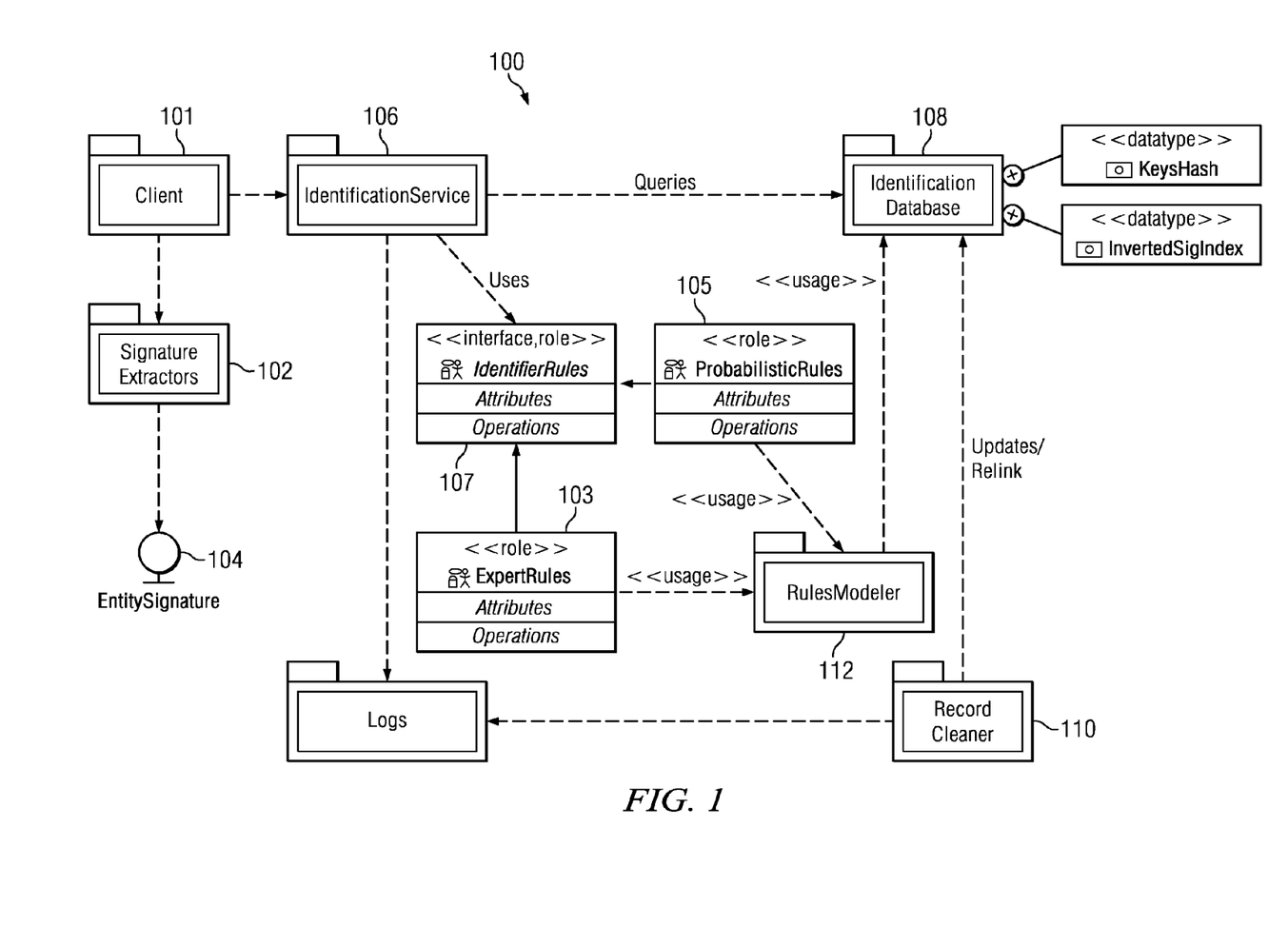
FIG. 1 illustrates a representative implementation of the entity identification mechanism.

The components of the identification system are shown in FIG. 1. These components are shown discretely for illustration and explanatory purposes only. The components may or may be implemented discretely or as an integrated system, and one or more components may be co-located or remote from one another. Typically, the one or more components are implemented in computer software executed in computer hardware, preferably in one or more machines, servers, programs, processes, execution threads, and the like. The mechanism also includes a database and associated data structures, preferably managed by a database management system.

Referring to FIG. 1, the identification system 100 comprises a number of logical and/or functional subsystems. A first subsystem is a signature extraction subsystem 102 that translates raw signature data into a feature set encoding that is used within the system to locate and extract identifiers. Preferably, each entity is identified by a string attribute ID, which uniquely identifies the entity, and a set of model parameters that are or can be used alone or together to uniquely define the value of the ID. The set of parameters models the entity and together comprise a unique representation of the entity. This unique representation is referred to herein as an entity signature 104. A second subsystem is a real-time identification service 106 and its associated entity database 108. The entity database 108 is the central database that contains the model parameters that are required for retrieving an entity identity, typically based on different subsets of incoming attributes. The identification service 106 identifies an entity in the database (assuming one exists) by searching the database using incoming feature attributes that are input as a set of query parameters. The search process applies a set of rules (as described in more detailed below) and computes matching scores, resulting either in the retrieval of an entity identity from the database 108 or the creating (and storing therein) of a new entity identity. The system 100 also includes a third subsystem 110 for maintaining and updating of the entity database 108. A fourth subsystem 112 updates decision rules and functions. The database 108 preferably is continuously updated, e.g., to add new entity identities, update dynamic feature attributes for each entity identity, to delete duplicate entity identities (i.e., identities that refer to the same entity), as well as to resolve one or more identities that represent the same entity.

The identification service operates according to rules. These rules include expert rules 103 that apply to deterministic (key) data, and probabilistic rules 105 that apply to usage feature (dynamic) data. The rules preferably follow a rule definition interface 107.

One or more clients 101 access the identification service by making requests for content. A request for content typically has associated therewith deterministic data and/or usage feature data associated with the network-connected entity. According to this disclosure, when the request for content is associated with non-key data (described in more detail below) such as usage feature data, a probabilistic matching function (defined in one of the rules 105) is applied to a measure of closeness (e.g., derived from a distance metric) between the usage feature data and a set of encoded feature attributes to determine whether an entity identity associated to that request is already present in the database 108. If so, then the entity identity is used to facilitate the response to the request for content. The content requested may be of any type, and the usage feature data may be associated with the request in any manner. While the client may be a mobile device, this is not a limitation. The client may be any machine, system, application, or other computing resource that makes a request to the system, irrespective of protocol, transport or request semantics. As noted above, a method for identifying an entity begins by generating a unique entity identity for the entity. The entity identity is generated from a set of feature data that model the entity. The feature data typically includes data associated with a feature data "type" selected from a set of feature data types, the set of feature data types being one or more of: deterministic data, device and system-specific feature data, and usage feature data. Deterministic data is sometimes referred to as "key" data, while the other types of data are sometimes referred to as "non-key" data.

The deterministic data is data (e.g., a cookie, a device identifier, an MSISDN, a phone number, an email address, a user identifier, or the like) assigned to a user by a provider. The device and system-specific feature data may be quite varied and typically is one of: operating system (OS) type, OS version, system clock value, execution speed, time of last installation, time of last boot, system default language, system local time, time zone offset, orientation, a display metric, a globally unique identifier (GUID), a model, a brand name, and a build version. The usage feature data also may be quite varied and typically is one of: HTTP headers, usage agent information, user query data, application launch time, application exit time, network type, page load time, page unload time, day and time of access, day of week, time of day, page referrer, plug-in data, geo-data, location data, URL view data, typing frequency data, and gesture data. In this approach, the entity identity is generated by applying to the feature data one or more rules selected from a set of rules, the one or more rules identifying which of the feature data to use to generate the entity identity, wherein the one or more rules include at least one deterministic rule, and at least one probabilistic rule. Periodically, a unique entity identity is merged into one or more entity identities that are found, by applying a rule, to represent a same entity.

Figure 2:
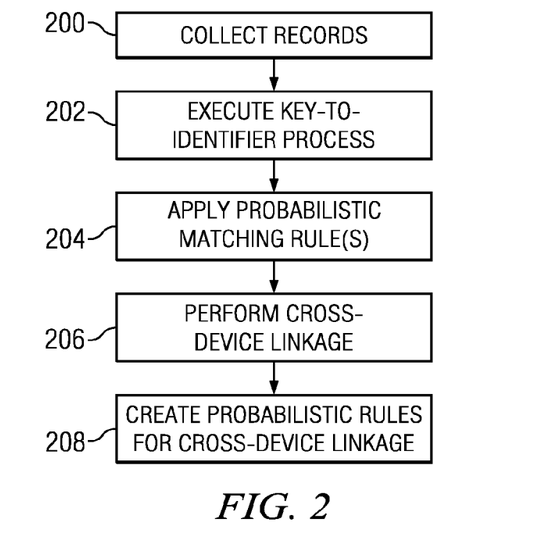
FIG. 2 is a flowchart illustrating a technique for creating and updating the entity identity database.

FIG. 2 is a process flow that illustrates how to bootstrap and update the entity database 108.

The routine begins at step 200 with record collection. Preferably, transaction data are organized at session level and feature attributes retrieved. Key fields are identified, typically through pre-processing. At step 202, a key-to-identifier process is executed. For records with keys (such as, without limitation: device id, cookies, email addresses, MAC, ESN, domain-specific identifiers, such as publisher signup identifications) initial id fields are populated using a key2id function. This function may be implemented using a hash function, such as MD5, SHA-1, a mathematical transformation, or the like. The key-to-identifier process also updates database tables by filling part of the records with generated identifiers. As a result, some portion of the database contains records with the unified identifiers, while the remaining records have their ID field as yet unfilled. The records that include the unified identifiers are then denoted LinkedSet1. At step 204, probabilistic matching rules (ProbRule) are applied on the remaining records and using data from non-key fields. Preferably, the rules are run on the records remaining after step 202 to create LinkedSet2. The union of LinkedSet1 and LinkedSet2 comprises the set of all records in the database. At step 206, cross-device linkage is carried out. In this step, subsets of LinkedSet1 are cross-referenced against known keys (such as e-mail address, phone number, and the like) to join records from different devices, preferably by setting all generated identifiers to the first one in any applicable record while deleting others. The impacted data records are then merged and denoted as LinkedSet3. At step 208, probabilistic rules for cross-device linkage are created using LinkedSet3 as training data with labeled examples and a remainder as unlabeled examples. The rules are then applied to the complements of LinkedSet3 to join records from different devices that belong to the same entity.

Preferably, attribute values of the database are also updated periodically to reflect changes in the values over time. For numerical values, deviation from the normal range is computed for upcoming records. When there the deviation goes beyond a certain threshold, the value is updated to the new value with given rate as $H_{t+1}(F\_i,)=\theta*H_t(F\_i,) (1-\theta)*Deviation$, with $\theta$ being an adjustable parameter in the region [0, 1].

Figure 3:
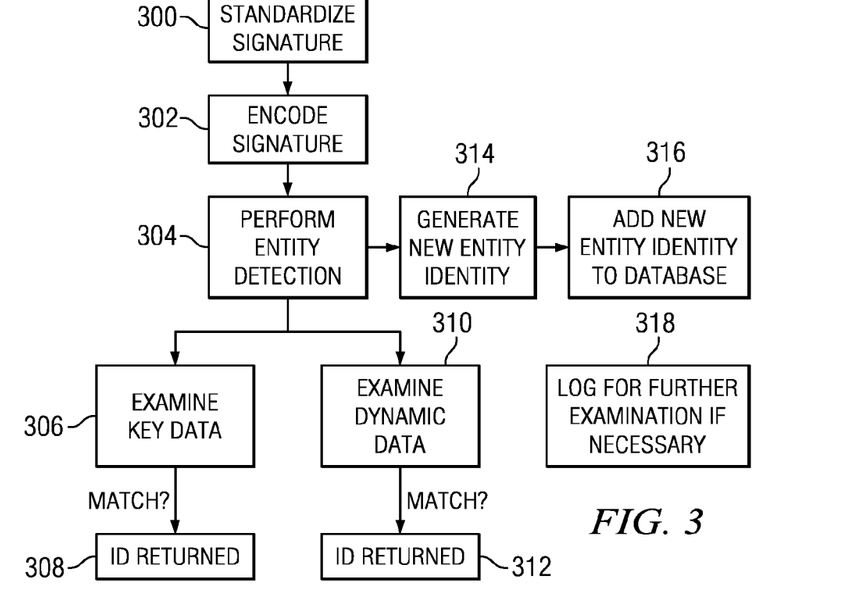
FIG. 3 is a flowchart illustrating the runtime processing of a lookup against the entity identity database.

FIG. 3 is a process flow that illustrates steps taken by the run-time processing for identifier lookup from the database, as well as more detailed steps in bootstrapping and updating the database. The process takes a signature as input, and performs a series of operations. These operations begin at step 300 by first standardizing the signature. At step 302, the signature is encoded, preferably using different encoding functions for each of one or more features $\{H(F\_i): I=1, 2, \ldots, n\}$. The routine then continues at step 304 to perform entity detection. Preferably, detection is done through a logical decision process on the signature data, with the logic involving a set of one or more expert rules, and one or more probabilistic rules. Thus, at step 306, deterministic keys are examined for lookup to find a match. This step may be performed by key value lookup, via hash lookup, or the like. If a match is found, the identifier associated with the key is returned at step 308. Concurrently with step 306, probabilistic rules are examined at step 310 with one of several possible outcomes. If applying a rule returns a known identifier, that identifier is returned at step 312. If applying a rule does not return a known identifier, a new identifier is generated and then added to the database at step 314. The new identifier is returned to the client at step 316. If no identification can be made, the entity is logged for further examination at step 318. Preferably, steps 306 and 310 are done in parallel, but this is not a requirement.

The following provides additional details regarding the database and the rules that are evaluated to generate the unique entity identity.

As noted above, preferably each entity in the database is identified by a string attribute ID, which uniquely identifies the entity, together with a set of features that can be used alone or together to uniquely define the value of the ID. The first subsystem creates the entity signature 104 (in FIG. 1) by applying one or more signature extractors to provide a feature set encoding on one or sets of feature data provided by, or in association with, the client. Depending on the type of features, different features are encoded in different formats. Thus, in one example embodiment, the encoding is done through a set of transformations, namely, from a feature space $F=\{ID, F_i, Timestamp: i=1, 2, \ldots, n\}$ into a representation space $H=\{ID, H(F_i): I=1, 2, \ldots, n\}$. The transformation $H( )$ may be a simple transformation, a scalar, or a vector comprising one or more values such as: value, recency, frequency, a probability distribution, one or more parameters of distribution, and the like.

As noted above, one type of deterministic identifier may be (or include) a "key." A key is a single attribute that that can be used to look up the ID of the entity uniquely. A key typically is an identifier (e.g., a cookie, a device identifier, an MSISDN, a phone number, an email address, a user identifier, or the like) assigned to a user by a provider. Keys typically take a string format. For fast access, the transformation may be implemented using a hash function, such as MD5, SHA-1, or the like. In this case, a hash function can be used for encoding the original keys. For example, the following rules may be used to produce a new key. Thus, for example, let HASH (SEED) be a hash function (such as SHA1, MD5) that produces a string hash with key value "SEED." The function HASH (SEED) is then used as the new value. Without limiting the foregoing, the following seed keys may be used by default for certain popular mobile device OS, which results in ODNI-1 equivalent keys: MAC/UUID for iOS, Android_ID for Android, and DeviceUniqueId for Windows-based phone. If the key is not available, a random seed may be generated and used instead. Depending on the application environment, some form of application data transmission mechanism (such as UIPasteboard in iOS) is used to transmit the hash value to ensure that all applications use the identical ID. In addition to the hashed keys, information regarding how the hash value is generated (e.g., key types such as MAC, IMEI, and the like) may also be transmitted to the system to facilitate processing.

With many client devices, it is quite common for multiple applications and even web browser instances to be used at the same time from a single device. As described herein, a primary goal of feature collection is to generate a unified identifier that can serve to link all applications and web usage to the same user (or defined user group). For web browsers, typically cookies are used as default keys. To link a hash ID to a browser cookie, a browser can be opened from an application with the URL to the server, which then sets a cookie if it does not already exist. In the process, the hashed key is sent to the server along with the cookie using known mechanisms (e.g., a URL decorating mechanism). In mobile devices, device IDs, such as UDID for iOS, as well as MAC, MEID, IMEI, and ESN, can be used as such keys.

Turning to the non-key data, preferably numeric feature variables, such as access durations, time zone offset, and the like, are encoded as numerical and, in particular, in the format of numerical attributes. Categorical features, such as device models, are used as such and preferably are encoded as string or integer categorical encodings. Another encoding type is range, such as day of the week, hours of the day, and call duration. Categorical features may also be grouped into sets, which preferably are used as a single feature entity. Other features, such as access patterns, may be represented in the form of a probability distribution. One such attribute may be one of: typical access patterns, usage durations of applications, and web site content. A probability distribution may be represented parametrically, or the variables may be binned and a cumulative distribution used. The feature set may comprise direct encoding of the above attributes through one or more transformations. Further, inferred attributes, such as classification of users into behavior categories, social groups, and household, may also be included.

When the same entity uses different devices to access the same content, identifiers from different devices can be linked to the same entity using shared keys, such as email or other key matching, or jointly through usage and other external features. Preferably, and as will be described in more detail below, this is done through lookup steps that include applying a set of rules, including expert rules and probabilistic rules, on a selected feature subset.

As illustrated in FIG. 1 the identification service subsystem uses a set of identification rules, which are now described. In real-time, or as a back-end process, a set of one or more distance metrics preferably are used to measure the closeness of each encoded feature attribute $H(F_i)$ to the incoming attributes. Depending on the type of attributes, the following types of distance metrics may be used: numerical distance (Euclidian distance), categorical distance, string distance (including token-based distances, such as TF-IDF), set membership, and probabilistic distance (for use with attributes such as access durations, time of the day, and the like).

Advantageously, multiple distance metrics are used together in a single framework. Thus, for example, string metrics may be used on device models and user agents; category metrics may be used on contextual categories and some typical demographic attributes. Probabilistic distance may be used on access time, behavior features, or the like. In particular, it is desirable to define a set of rules on the distance metrics, which are then mixed using the expert and probabilistic rules to identify and retrieve the unique entity identities.

For example, in the case of mobile advertising, a request for an advertisement (an "ad request") may be received by the system with or without deterministic data, such as a cookie, deviceID, client IP address, latitude or longitude, etc., along with a URL indicating the content. There may multiple expert rules such as: use fast string matching on deterministic data such as cookie, deviceID, or email address; use distance matching (e.g., using a numeric distance metric) on other types of deterministic data, such as longitude and latitude, and the like. The above may generate one or multiple candidate entity identities. Preferably, there is also at least one probabilistic matching rule that is then applied to filter the entity identities further (and in a more fine-grained manner) across a narrow search window in the database. One such probabilistic rule may be: compute a match on a joint distribution of usage including one or more of: content type, time of day, usage duration, and the like. There may be one or many passes against the database, or against the results returned from the database. After applying the expert and probabilistic rules in this manner, a response to the ad request is returned. The response may be either the entity identity, or given content (e.g., an advertisement) that is selected based on the entity identity returned from the database search.

Without limitation, a distance metric used in association with a rule may be binary matching distance. The simplest rule is that of the binary match on key values. In this case, the Distance $(H(F_{Key}), H(S_{key})=0$ if and only if the encoding of the two attributes matches exactly. Traditionally, the binary matching scores are used for record linkage with string attributes. This approach can be extended to other types of attributes using the distance metrics. In general, for each feature attribute, a threshold is set. If the distance is above a threshold, the rule match score is set to 1 (no match) and 0 (otherwise). This allows the sub-system to extend the binary matching rule to any type of attribute and to derive practical probabilistic rules that involve more many attributes at the same time. For example, and using the binary rules on distance with respect to sets, if an incoming attributes is a set member, it is considered a match (value 0) and no-match (value 1) otherwise. As another example, the binary score may be extended to probability distributions. Thus, when the attributes are a probability distribution, a binary rule is used to describe, preferably with a confidence level, whether a feature attribute comes from the distribution function.

A more general case is to assign a scalar score (e.g., a continuous variable between [0, 1]) that represents a degree of matching. The score is used to define the rules by modeling. Matching rules determine how signature data is used to identify unique entity identities. For each incoming feature set $\{S_i, 1<=I<=n\}$, the system computes the distance of each feature against a subset of candidate matching records in the database. A matching rule takes the distances as input and makes a decision if the features are mapped to an existing entity identity in the database.

A deterministic rule is one that returns one or more entity identities (each associated with an identifier):

Rule:$\{\text{DistanceOf}(H(F_i),H(S_i)):1<=I<=n\} \rightarrow ID$.

A simple example is when the incoming feature $S_i$ is a cookie. In such case, the DistanceOf function then evaluates using a precise string match rule, taking a value of 1 (where there is no match) and 0 (when there is a match). In another example, using IP address and location parameters, the expert rule may dictate that the device models are used together; a match is found when the parameters return a DistanceOf=0. Of course, these examples are merely representative.

When, however, there are no features to be used as keys for looking up the identifiers, preferably one or more probabilistic rules are used. A preferred approach implements the concept of record linking-oriented reconciliation. Record linking (RL) refers to the task of finding records in a data set that refer to the same entity across different data sources (e.g., data files, books, websites, databases). Record linkage is necessary when joining data sets based on entities that may or may not share a common identifier. A mathematical theory of this type is described in the article titled "A theory for record linkage," by Fellegi and Sunter, and subsequent works by others. One type of record linking is deterministic or rules-based record linkage, which generates links based on the number of individual identifiers that match among the available data sets. A more complex approach, probabilistic record linkage, takes into account a wider range of potential identifiers, computing weights for each identifier based on its estimated ability to correctly identify a match or a non-match, and using these weights to calculate the probability that two given records refer to the same entity. In this approach, record pairs with probabilities above a certain threshold are considered to be matches, while pairs with probabilities below another threshold are considered to be non-matches; pairs that fall between these two thresholds are considered to be "possible matches" and may or may not be linked. The techniques of this disclosure preferably take advantage of this record linking-oriented reconciliation, preferably in conjunction with expert rules.

Such an approach is advantageous when persistent stored identifiers (such as a cookie or a device identifier from the client side) are not available to the system. Another situation in which the probabilistic rules are used is to facilitate cross-device key linkage. Yet another usage is to create and/or retrieve an entity identity in individual user and/or user group (such as household) identification. Most of the time, the same user will use multiple devices. Although it may happen that there are deterministic keys (such as device id or cookie for each device), there is no data to link the two keys to the same user of the devices. This disclosure addresses that use case.

As a generalization of the above-described RL techniques, a probabilistic rule is one that makes a decision based on rank score of match with given confidence levels on matching and mismatching (ConfidenceMatch>ConfidenceUnmatch>=0)

$$\text{RankScore}(ID|(F_i,S_i):1<=I<=n)=\text{RankScore}$$
$$(\gamma=\text{Kernel}(\text{DistanceOf}(H(F_i),H(S_i))<\text{Threshold}_i):$$
$$1<=I<=n),$$

In this above, Kernel ( ) is a predefined function, measuring the degree of matching, and $\text{Threshold}_i$ a predefined parameter. When Kernel ( ) is the indicator function, the value 1 indicates a match in the feature attribute and the value 0 represents no match. In general, a kernel function can be used to better measure the degree of matching. Different kernel functions can be used depending on the type of feature attributes.

Rule:
If RankScore($\gamma$)>ConfidenceMatch then ID is a match
Else If RankScore($\gamma$)<ConfidenceUnmatch ID is not a match
Else Investigate Preferably, probabilistic rules are generated from historical data in the database as described below.

As noted above, the techniques of this disclosure enable signature data to identify unique entities through a set of signature encodings, together with the application of expert rules and probabilistic rules. This is through a set of rules of the form:

$$\text{Rule}(S_i,t:1<=i<=n) \rightarrow ID.$$

Preferably, the rules are ordered and ranked {Rule_k: k= 1, . . . , m}. One or more criteria may be used for ranking, wherein the specifics of the ranking depends on data distribution.

In one embodiment, default rule ranking follows the following sequence. First, feature sets with deterministic keys are selected. Second, feature sets are ranked in descending order based on frequency of occurrence, resulting in key set $S_{key\ 1}>S_{key2}>\ldots>S_{keyn}$. Then, deterministic rules are examined Rule($S_{key}$) are examined in order of occurrence and return the first time a ID is found. Finally, if no ID is found with deterministic keys, probabilistic rules are than examined.

As described in the Felligi-Sunter approach, probabilistic rules preferably are generated (learned) from historical data sets. The goal of learning is to derive a score function that can be used to match and rank incoming entities to those in the identification database. That is, it is desired to learn a rank score function such that for each matching vector $\gamma$, the score RankScore($\gamma$) is computed. A number of methods may be implemented for this purpose, e.g., one based on unsupervised learning, and the other on supervised learning. In the unsupervised learning setting, a record linkage framework is adopted. In this framework, the rank score is computed using two probabilities as $$\text{RankScore}(\gamma)=\text{Prob}(\gamma|\text{Matched})/\text{Prob}(\gamma|\text{Unmatched}),$$

where Matched and Unmatched are the set of matching and unmatched subset of pairs from the incoming stream to the database, respectively.

One way of computing the score is to compute the probabilities Prob($\gamma$|Matched) and Prob($\gamma$|Unmatched), and Prob (Matched) and Prob(Unmatched). The use of binary distance functions greatly simplifies the process. When more than string attributes are involved, the following more general formulation may be used:

$$\text{Prob}(\gamma|C),f(\Sigma_i W_i \text{Kernel}(\gamma_i,\theta_i),$$

with f being a function such as logit function, C a class (Matched or Unmatched) and $W_i$ and $\theta_L$ parameters to be learned.

The following is an example of how a machine learning algorithm (e.g., EM) is used for computing the probabilities. Another method is to use classification rules for the purpose. Preferably, the probabilities are updated periodically with a fixed sliding window on transaction data (for example, all transactions from over a given period). Specific windows size preferably depends on the volume of transaction and complexity of data. The probabilities may be computed using a bootstrap database to compute match score based on data from a time window, where Tb=Short Moving Window (hours or days depending on specific dimensions) and Ta=Time window of use in the database. To create a bootstrap database, the following steps may be implemented. First, a subset of records with known IDs are obtained. A unique key $S_{key}$ and non-overlapping time intervals Ta<Tb are then selected. Next, records with large enough subsets with the key $S_{key}$ are then selected:

i. A={ID, $F_{key}$, $H(F_i)$, t: $F_i$ is a non-key attribute, t are in Ta} and ii. B={ID, $F_{key}$, $H(F_i)$ t: $F_i$ is a non-key attribute, t are in Tb} Thereafter, the Cartesian A×B is formed, where Match is the subset of pairs in the product such that the ID's match, and Unmatch the remaining pairs. The routine then computes Probability P (Match) and P (Unmatch). The routine then maximizes the log-likelihood by estimating a marginal distribution of each dimension $H(F_i)$. The last two steps are then repeated until the probability converges to a computed probability. The above probabilities are then used to generate ID for records without known ID. The bootstrap database is then replaced by the full database, and the above step beginning with forming the Cartesian and continuing are repeated to calibrate the new probability distribution.

The use cases for the disclosed subject may vary but the typical scenario will be as follows. The technique may be implemented in a runtime platform having a database associated therewith. The platform responds to requests, typically received via http or the like, looks up into the database to identify an entity identity, retrieves that entity identity, uses the retrieved entity identity to process the request, and then returns a response. The request may be received from a publisher, an ad network, an ad exchange (all entities that sell media), or it may be received from an advertiser or the like (entitles that seek to buy media). The database may be distributed. The request to the platform may occur in response to some other request, such as the user of a mobile device making a request to a publisher website. A goal in this scenario is to return to the mobile device user a targeted ad. To this end, the runtime platform performs entity identity determination and, optionally, an ad selection function. In particular, the platform matches the incoming request against an inventory of advertisements and attempts to find the best advertisement(s) to return in response to the request.

An ad request may arrive at the platform with data associated with a deterministic data key, in which case that data typically is used for the entity identity look-up (based on one or more deterministic (expert) rules). As noted above, such deterministic data typically is a cookie, deviceID (e.g., UDID, ODIN, Open UDID, Android_ID, or the like), email address, telephone number or the like. Deterministic data may be encoded (e.g., using string encoding) prior to applying distance metrics (typically numerical string distance) or the like to identify potential matches in the entity database. In a more interesting scenario, the deterministic data is not present with the request or the evaluation of such data (if it is present with the request) does not generate an entity identity from the database, in which case the entity identity must then be determined using available dynamic (non-key) data (and the one or more probabilistic rules). As noted above, this feature data may be of various types: IP address, user agent, location, context, some behavior data, etc. As described above, in this approach an encoding $H(F_i)$ of one or more of the feature set attributes is generated. During the lookup on the database, a distance metric is used to measure the closeness of each encoded feature attribute (or a set of such attributes) to the incoming attributes. The distance metric may be numerical distance, categorical distance, string distance, set membership, or probabilistic distance. A probabilistic function is then applied to compute a match on an entity identity in the database. Preferably, the mobile device that interacts with the mobile ad platform is a smartphone or tablet, such as the iPhone® or iPad®, an Android™-based mobile device, or the like. Such a device typically comprises a CPU (central processing unit), such as any Intel- or AMD-based chip, computer memory, such as RAM, and a drive. The device software includes an operating system (e.g., Apple iOS, Google® Android, or the like), and generic support applications and utilities. The device may also include a graphics processing unit (GPU). A touch-sensing device or interface (e.g., a touch-screen) is configured to receive input from a user's touch. The touch-sensing device recognizes touches, as well as the position, motion and magnitude of touches on a touch sensitive surface (gestures).

Generalizing, the mobile device is any networked device on a communication network, wired or wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., a Blackberry® device, an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

In a representative embodiment, the mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email, WAP, paging, or other known or later-developed wireless data formats. Generalizing, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

Generalizing, a machine upon which the mobile ad identification system is implemented typically comprises commodity hardware and software, storage (e.g., disks, disk arrays, and the like) and memory (RAM, ROM, and the like). The particular machines used in the system are not a limitation of the disclosed technique. A given machine includes network interfaces and software to connect the machine to a network in the usual manner. The subject matter may be implemented as a standalone product, or as a managed service using a set of machines, which are connected or connectable to one or more networks. More generally, the product or service is provided using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, .ASP), and a set of applications or processes (e.g., AJAX technologies, Java applets or servlets, linkable libraries, native code, or the like, depending on platform), that provide the functionality of a given system or subsystem. A display may be used to provide a visual output. As described, the product or service may be implemented in a standalone server, or across a distributed set of machines. One or more functions may be carried as using software and as a service (SaaS). Typically, a server connects to the publicly-routable Internet, an intranet, a private network, or any combination thereof, depending on the desired implementation environment.

A service provider architecture that implements the above-described functionality comprises machines, systems, subsystems, applications, databases, interfaces and other computing and communications resources. In one embodiment, a predictive data service provider architecture comprises an IP switch, a set of one or more web server machines, a set of one or more application server machines, a database management system, and a set of one or more administrative machines. A representative web server machine comprises commodity hardware (e.g., Intel-based), an operating system such as Linux, and a web server such as Apache 2.x. A representative application server machine comprises commodity hardware, Linux, and an application server such as Tomcat, JBoss or WebLogic 9.2 (or later). The database management system may be implemented as an Oracle (or equivalent) database management package running on Linux. The infrastructure may include a name service, FTP servers, MRCP (Media Resource Control Protocol) servers, load balancing appliances, other switches, and the like. Each machine typically comprises sufficient disk and memory, as well as input and output devices. The software environment on each machine includes a Java virtual machine (JVM) if control programs are written in Java. Generally, the web servers handle incoming http requests, and they export an interface as a set of web pages. The application servers manage the basic functions described above. Administrative servers handle administrative functions including, without limitation, logging, billing, reporting, and the like. While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Having described our invention, what we now claim is as follows.

The invention claimed is:

1. A computer program product comprising a non-transitory machine-readable medium that stores a program, the program being executed by a machine to perform a method of identifying a network-connected entity across multiple device-, usage- and application-domains, the method comprising:

maintaining a database comprising entity identities, wherein an entity identity has associated therewith a set of encoded feature data;

periodically updating the database by merging into a unique entity identity one or more entity identities that are found to represent a same entity by the following sub-steps:

applying at least one expert rule to identify a first subset of the entity identities; and applying, to each of one or more pairs of entity identities in the first subset, a probabilistic matching function to a measure of closeness between the encoded feature data of each entity identity of the pair to determine if the pair represent the same entity;

responsive to a request for content, the request having associated therewith usage feature data associated with the network-connected entity;

applying at least one expert rule to identify a second subset of the entity identities;

if the second subset has more than two entity identities associated therewith, applying, with respect to each such entity identity in the second subset, a probabilistic matching function to a measure of closeness between the usage feature data in the request and the encoded feature data associated with the entity identity;

as a result of applying the probabilistic matching function to each of the entity identities in the second subset, determining if the request is recognized as originating from an entity whose entity identity is stored in a database; and if the request is recognized as originating from an entity whose entity identity is stored in the database, using the entity identity to construct a response to the request for content.

2. The computer program product as described in claim 1 wherein the measure of closeness is derived from a distance metric.

3. The computer program product as described in claim 2 wherein the distance metric is one of: numerical distance, categorical distance, string distance, set membership, probabilistic distance, and combinations thereof.

4. The computer program product as described in claim 1 wherein the request has associated therewith deterministic data associated with use of the device by the entity.

5. The computer program product as described in claim 1 wherein the device is a network-connected computing device and the usage domain is online.

6. The computer program product as described in claim 1 wherein the entity is a set of users associated with a household.

7. The computer program product as described in claim 1 wherein the usage feature data is associated with multiple devices.

8. The computer program product as described in claim 1 wherein the entity is one of: a device, a user of a device or set of devices, a user of one or more applications on a device, and a group of users of the device or set of devices.

9. The computer program as described in claim 1 wherein the usage feature data is one: HTTP headers, usage agent information, user query data, application launch time, application exit time, network type, page load time, page unload time, day and time of access, day of week, time of day, page referrer, plug-in data, geo-data, location data, URL view data, typing frequency data, and gesture data.

10. Apparatus, comprising:

at least one data processor; and computer memory holding computer program instructions which, when executed by the data processor, perform a method of identifying a network-connected entity across multiple device-, usage- and application-domains, the method comprising:

maintaining a database comprising entity identities, wherein an entity identity has associated therewith a set of encoded feature data;

periodically updating the database by merging into a unique entity identity one or more entity identities that are found to represent a same entity by the following sub-steps:

applying at least one expert rule to identify a first subset of the entity identities; and applying, to each of one or more pairs of entity identities in the first subset, a probabilistic matching function to a measure of closeness between the encoded feature data of each entity identity of the pair to determine if the pair represent the same entity;

responsive to a request for content, the request having associated therewith usage feature data associated with the network-connected entity, applying at least one expert rule to identify a second subset of the entity identities;

if the second subset has more than two entity identities associated therewith, applying, with respect to each such entity identity in the second subset, a probabilistic matching function to a measure of closeness between the usage feature data in the request and the encoded feature data associated with the entity identity;

as a result of applying the probabilistic matching function to each of the entity identities in the second subset, determining if the request is recognized as originating from an entity whose entity identity is stored in a database; and if the request is recognized as originating from an entity whose entity identity is stored in the database, using the entity identity to construct a response to the request for content.

11. The apparatus as described in claim 10 wherein the measure of closeness is derived from a distance metric.

12. The apparatus as described in claim 11 wherein the distance metric is one of: numerical distance, categorical distance, string distance, set membership, probabilistic distance, and combinations thereof.

13. The apparatus as described in claim 12 wherein the probabilistic matching function is computed as a kernel function using one or more distance metrics.

14. The apparatus as described in claim 10 wherein the request has associated therewith deterministic data associated with use of the device by the entity.

15. The apparatus as described in claim 10 wherein the device is a network-connected computing device and the usage domain is online.

16. The apparatus as described in claim 10 wherein the entity is a set of users associated with a household.

17. The apparatus as described in claim 10 wherein the entity is one of: a device, a user of a device or set of devices, a user of one or more applications on a device, and a group of users of the device or set of devices.

18. The apparatus as described in claim 10 wherein the usage feature data is one: HTTP headers, usage agent information, user query data, application launch time, application exit time, network type, page load time, page unload time, day and time of access, day of week, time of day, page referrer, plug-in data, geo-data, location data, URL view data, typing frequency data, and gesture data.

19. The computer program as described in claim 1 wherein the method further includes:

if the request is not recognized as originating from an entity whose entity identity is stored in the database, storing the result as an entity identity in the database.

20. The apparatus as described in claim 10 wherein the method further includes:

if the request is not recognized as originating from an entity whose entity identity is stored in the database, storing the result as an entity identity in the database.

* * * * *